Sept. 8, 1970 K. KRAMER ET AL 3,527,274
CONTINUOUS DOVETAILING MACHINE
Filed Oct. 21, 1966 7 Sheets-Sheet 4

INVENTORS
KURT KRAMER
ERWIN DIMTER

BY
Sherman Levy ATTORNEY

United States Patent Office 3,527,274
Patented Sept. 8, 1970

3,527,274
CONTINUOUS DOVETAILING MACHINE
Kurt Kramer, Auerstr. 12, and Erwin Dimter, Rudolf-Diesel Str. 12, both of Illertissen, Germany
Filed Oct. 21, 1966, Ser. No. 588,409
Claims priority, application Germany, Oct. 22, 1965,
D 48,473; Oct. 23, 1965, D 48,485; Oct. 13, 1966,
D 51,293
Int. Cl. B27f 1/02
U.S. Cl. 144—91   2 Claims

ABSTRACT OF THE DISCLOSURE

A continuous dovetailing machine in which workpieces are fed by means of holders to tools, and wherein the boards or workpieces are selectively advanced, the boards or workpieces adapted to be gripped by clasping holders while they are being carried past milling tools so that displacement or shifting cannot take place, and wherein the clamping holders are capable of accommodating boards of any desired width or thickness.

---

This invention relates to a continuous dovetailing machine in which relatively to at least one tool the work pieces to be machined are fed to the tool by means of holders moved by conveyor bands, chains or the like and are firmly held at least temporarily by the tool during machining and in which at least one self-acting positioning device effects the displacement of the work pieces perpendicularly to their direction of movement and to the work tools in order to employ a one front slotting or oblong cutting tool and one profile cutter.

In the woodworking industry there are frequently waste pieces from planks. As wood is a relatively expensive material and the manufacture of planks themselves entails heavy costs it is understandable that trouble is taken to usefully employ the waste pieces of the planks. These waste pieces which as a rule are of different lengths are therefore dovetailed on their front ends and glued together to form new constructional elements. The dovetails themselves are as a rule produced with profile cutters adapted therefor whereby the individual workpieces are fed to the tool by means of a continuous conveying apparatus. In order to lose as little material as possible during cutting, positioning devices are provided which guide the individual workpieces to the tool in a position suitable for the machning procedure.

The problem on which the invention is based consists essentially in constructing a machine such that for the producing of dovetails as little expenditure of energy as possible is necessary, that is, the machine tool spindles and the tools themselves are driven with low motor power and that the machine nevertheless has a high thrusting power. This is attained in a simple manner according to the invention in that the tool spindles lying one behind the other with respect to the direction of movement of the workpieces are at a distance which is greater than the distance of two holders following one another so that at any time only one workpiece is in engagement with a tool.

It is obvious that due to this proposal every spindle in the work supply has available the whole installed motor output and according to a further feature of the invention the two tool spindles are driven preferably via a belt drive from a single motor. The distances of the tool spindles and two holders following one another are so selected that at any given time only a single workpiece is in engagement with a single tool of a pair of tools and that one workpiece only comes into engagement with a tool when the other workpiece leaves the other tool. Furthermore with this arrangement the advantage is attained that the motor is loaded substantially uniformly which acts favourably on its life.

A further feature of the invention consists in forming a positioning device such that by means of it workpieces of very different lengths can be fed precisely to the tools. The solution of this problem is attained according to the invention by providing a conveyor band which is equipped with preferably resilient taker bars whereby the plane formed by the band lies parallel to the direction of conveying of the workpieces and the longitudinal axis of the band subtends an acute angle thereto.

In order to avoid the workpiece being deflected from its regular position into the opened holder due to the displacement of the positioning device the rotating speed of the band is arranged to be so selected that the normal projection of the speed of rotation to the direction of movement of the workpieces is substantially equal to the speed of movement of the workpieces themselves.

It is furthermore quite possible and under certain circumstances corresponding to the direction of movement of the workpieces to provide behind the rotating band a pivotable stop bar capable of being fixed in its desired position. The rotating band is arranged above the bearing plane of the work pieces and the area of the band lying below is in working connection with the workpieces. In this way the band acts from the top onto the different workpieces whereby the resiliently flexible taker bars themselves compensate for any different workpiece heights.

In order that the whole working cycle may develop as automatically as possible in the machine tool it is arranged according to a further feature in accordance with the invention with regard to the direction of movement of the workpieces for a glue depositing apparatus movably mounted to be provided behind the tools which consists of a rotatably mounted roller-like body connected to a glue pump or the like the cross sectional outline of which is formed corresponding to the profile cutter. The glue depositing apparatus is thereby suitably pressed and drawn by the force of a spring on the workpiece so that due to the forced intensive contact thereby caused between the workpiece and the roller-like body a regular continuous depositing of glue takes place. For the positioning of the workpiece in respect of the glue depositing apparatus there is disposed in the area in front of the roller-like body a stop bar running parallel to the direction of movement of the workpiece in the area of which above the bearing plane of the workpieces a driven roller capable of being raised and lowered.

The axis of the driven roller lying in the direction of movement of the work pieces which presses from above onto the workpiece lying in the open holder and thereby pushes this in consequence of its autorotation against the said stop bar.

In order that the individual workpieces may not only be automatically held, positioned, machined and provided with a glue deposit but also after the completion of these individual working operations following one another in time but also be removed from the machine there is provided according to a further feature in accordance with the invention in the region of the guide rollers, pulleys or the like, the conveyor bands, chains or the like moving and guiding the holders at least one takeup receptacle for the workpieces which in its commencing area is at a tangent to the bearing plane of the work pieces and which in the direction of movement of the holders is always at a distance from same whereby the radial increase in the distance in the end region of the take up receptacle corresponds at least to the width of the jaws of the holders so that the workpieces still in the open holders lying on the takeup receptacle are gradually pushed out of these during the initiation of the restoring movement of the holders. A bearing face which is in working connection with a further conveyor band or the like takes up the individual workpieces pushed out of the holders by the takeup receptacle. This bearing face is provided in the guide region of the holders and at the end of the takeup receptacle and carries out a periodic forward and backward movement whereby for traversing along the workpiece a flange-shaped bar connected to this bearing face is provided.

Each holder consists of at least one pair of gripping jaws, gripping clamps, gripping plates or the like and the two jaws, clamps, plates or the like of one pair are disposed on separate conveyor bands, chains, cables or the like.

The individual cooperating plates are therefore arranged independently of one another on separate conveyor bands. One jaw, clamp, plate or the like may be constructed as a contact plate and the other jaw, clamp, cable or the like is connected to a lever mounted on a guided conveyor band this lever being formed pivotable relative to the contact plate by means of cams and contact tracks.

The conveyor bands, having the same peripheral speed running separately in the same direction are formed adjustable relative to one another to render it possible to vary the distance between the contact plates and the pressure jaws. For different thicknesses of workpieces therefore different adjustments can be selected.

Therefore it is advantageous for the conveyor bands, chains, cables or the like to be guided over a common driving shaft having driving wheels and the wheels serving as guide rollers mounted on a common shaft. This construction is simple and the adjustment of the conveyor band or chain relative to one another can be carried out by simple means. The conveyor apparatus may therefore be adapted at any given time exactly to the thickness of the workpieces.

The positioning device is formed as a turnstile mounted freely rotatable on a vertical axle which projects with its arms in the area of movement of the holders whereby it is taken along forcibly by the movement of same and thereby comes into working connection with the workpiece to be displaced.

The invention will be described with reference to the accompanying drawings.

Figure 1:
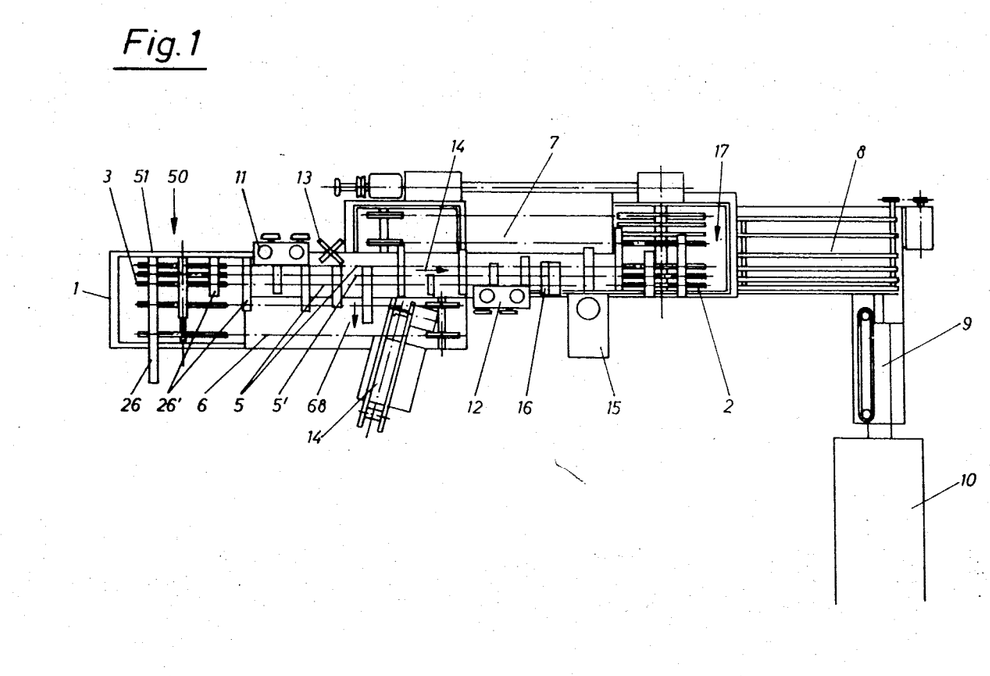
FIG. 1 shows a diagrammatic plan view of a two-sided continuous cutting dovetailing machine with delivery apparatus and the glueing press.

The two sided continuous cutting dovetailing machine shown in plan in FIG. 1 consists of a machine frame 1 known per se which has a characteristic longitudinal direction. Over the driving pulleys 2 and the guide pulleys 3 endless chains 5, $5^1$ are guided which carry the holders (FIG. 7) not shown in FIG. 1, for receiving and fixing the workpieces. The direction of movement of the workpieces carried by the holders is shown by the arrow 4. At both sides of the chains 5, $5^1$ carrying the holders there are provided conveyor bandlike transporting elements 6 and 7 which serve for the bearing and supporting of the parts of the workpieces lying opposite at any given time the actual machining station. The conveyor members 8 and 9 take over the workpieces machined and prepared for the glueing and pass these onto the glueing press 10.

On both sides of the conveying track formed by the endless rotating chains 5, $5^1$ lie the individual machining and positioning stations. In detail are shown: 11 and 12 tool spindle mountings or stocks each with a front cutting or oblong cutter and a profile cutter, 13 a turnstile for the positioning, 14 the positioning device formed as a rotating band, 15 the glue depositing apparatus, 16 the positioning device associated with the glue depositing apparatus and 17 the delivery side of the workpieces.

Before describing in detail the construction and the manner of operation of the individual parts just mentioned it is confirmed that the workpieces comprise plank-like parts which are provided at their two end faces with dovetails and in the area of the dovetail faces at least on one end face with a deposit of glue.

Figure 2:
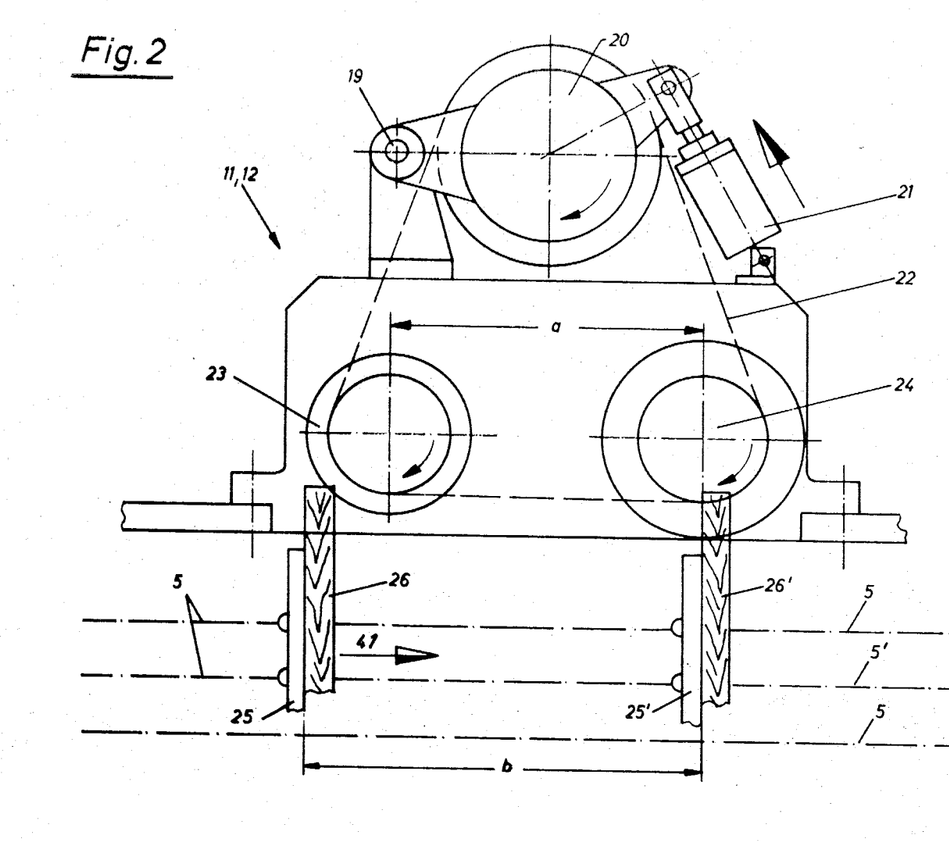
FIG. 2 shows also in plan and diagrammatically a tool spindle stock carrying two tool spindles.

The tool spindle stocks 11 and 12 which both have the same construction consist of a casing 18, a driving motor 20 pivotably mounted about the axle 19 operated by a hydraulic or pneumatic cylinder 21, is used the belt drive 22 as well as the two tool spindle mountings or 23, 24 carrying the tools (FIG. 2). The diagrammatically indicated holders 25, $25^1$ which carry the workpieces 26, $26^1$ clamped in are connected to the chains 5, $5^1$. It is essential and important in order to be able to obtain the advantages already mentioned for the tool spindles 23 and 24 lying behind one another in the direction of movement to be separated by a distance $a$ which is greater than the distance $b$ between two successive holders 25, $25^1$ so that at any given time only one workpiece is in engagement with a tool. Thus the tool spindle 23 is associated with a front slotting or oblong cutter and with the tool spindle 24 of a profile cutter.

The positioning device 14 (FIG. 3) consists of an endless rotating band 27 like a conveyor band which is equipped with resilient flexible taker bars 28. Whereby the plane formed by the band 27 lies parallel to the conveying direction 4 of the work pieces $26^{11}$, $26^{111}$ etc., and the longitudinal axis of the band 29 of the band 27 encloses with the direction 4 an acute angle. The speed of rotation Vp of the band 27 is thereby so selected that its normal projection to the direction of movement 4 of the workpieces is equal to the speed of movement Vf of the workpieces $26^{11}$, $26^{111}$ etc.

Figure 3:
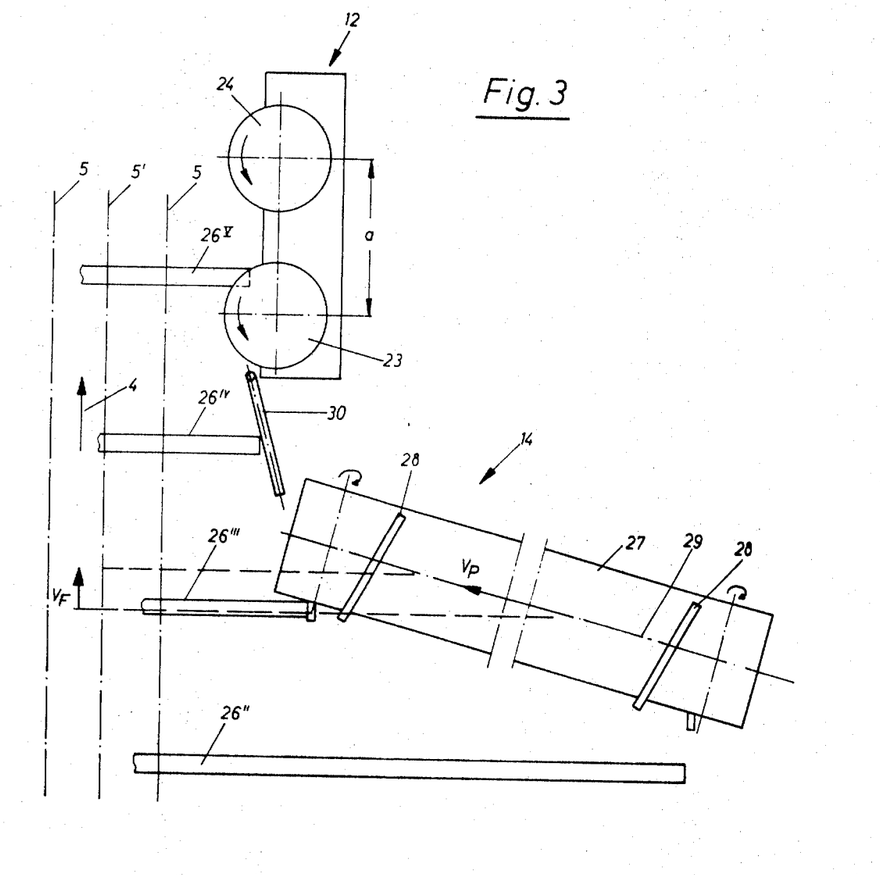
FIG. 3 is a diagrammatic positioning device in plan.

A stop bar 30 pivotable and fixable in its position serves for the further positioning of the workpieces (FIG. 3). The band 27 is disposed above the contact plane of the workpieces 26, $26^1$ etc., so that the area of the band 27 lying below comes into frictional connection with the workpieces 26, $26^1$ to be positioned.

Figure 4:
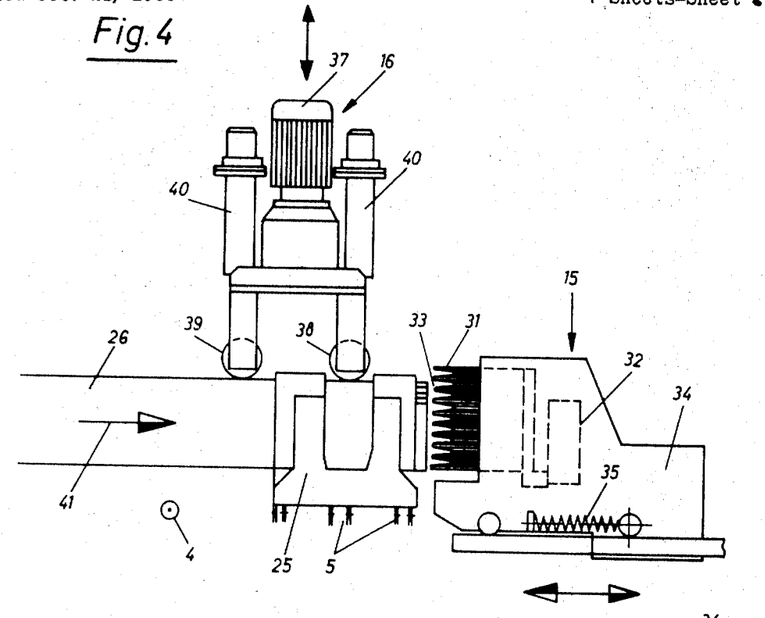
FIG. 4 shows the glue depositing device in elevation.

The glue depositing apparatus 15 as well as the positioning device 16 associated with this apparatus is seen in detail in FIG. 4. This glue depositing apparatus is provided behind the tool spindle stocks 11 and 12 in relation to the direction of travel 4 of the workpieces and movable perpendicularly to the direction of movement 4. It consists essentially of the rotatably mounted roller body 31 which is connected to a glue pump 32 whereby the roller body in respect of its cross-section outline 33 is formed corresponding to the profile cutter 24. The casing 34 carrying the roller body and the glue pumps is moved by the force of the spring 35 towards the workpiece 26. In the region of the glue depositing apparatus and in fact related to the direction of movement 4 of the workpieces before same lies a positioning device 16 as well as the stop bar 36. The positioning device 16 consists essentially of the two rollers 38 and 39 which are raisable and lowerable and driven by the motor 37. In the region of the stop bar 36 the holder 25 is opened and the rollers 38 and 39 are lowered on the workpiece and push this in the direction of the arrow $4^1$ to the right to the stop 36. As soon as the holder 25 has left the area of the stop bar 36 it closes and holds the workpiece firmly and in fact until it has passed the area of the roller 31.

Figure 6:
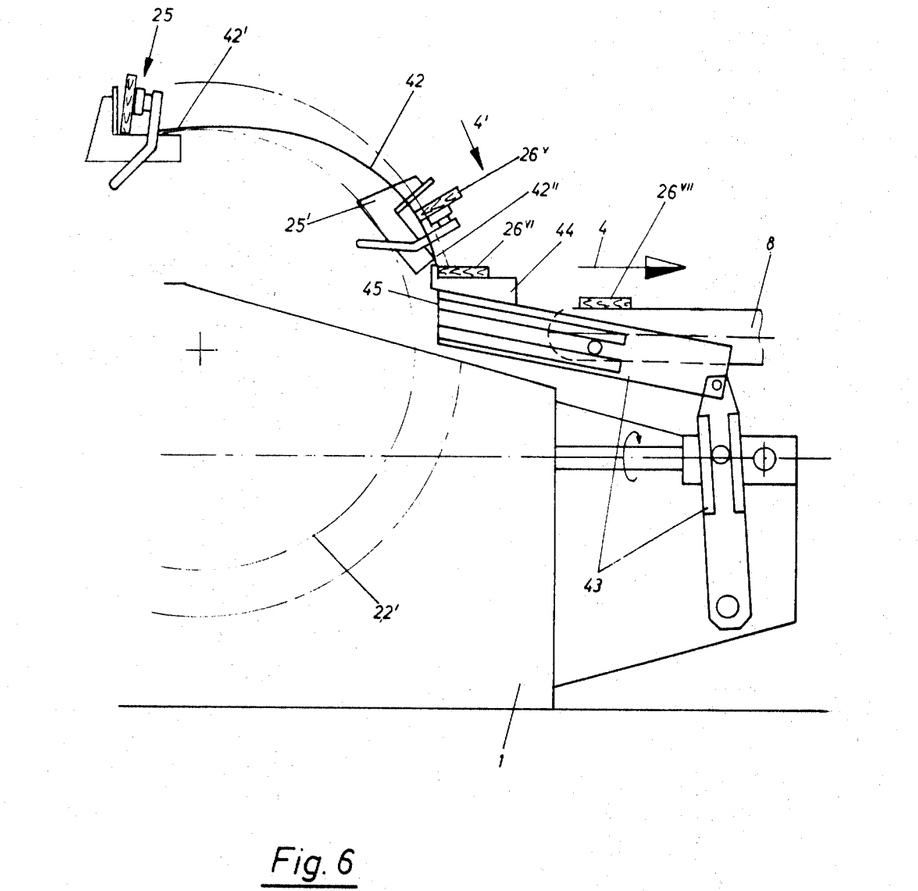
FIG. 6 shows the delivery apparatus seen from the side.

Behind the glue depositing apparatus 15 lie the driving pulleys 2 which guide the endless chains 5 and thereby the holders 25 to their initial position. Adjacent the guide and driving pulleys 2 is a run on receptacle 42 which in its commencing area $42^1$ crosses at a tangent the contact plane of the workpieces 26, $26^1$, $26^{11}$ etc., and which in the direction of movement $4^1$ of the holders 25, $25^1$ are always at a distance from these whereby the radial increase of the distance in the end area $42^{11}$ of the run on receptacle 42 corresponds at least to the width of the jaws of the holders so that the workpieces located in the opened holders are pushed along the run on receptacle 42 by these from the holders. At the end $42^{11}$ of the run on receptacle 42 lies the contact face 44 with the bar 45 acting as a horizontal carrier moving backwards and forwards in the working stroke in the lever mechanism 43.

Figure 7:
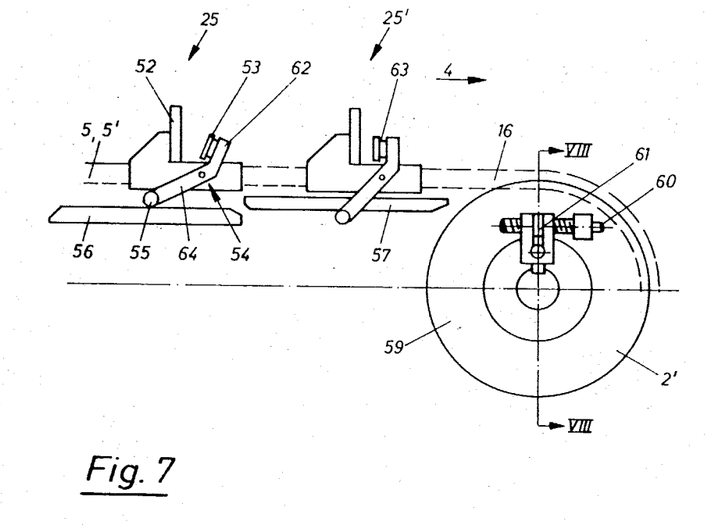
FIG. 7 shows a side view of the holders disposed on the conveyor chains.
Figure 8:
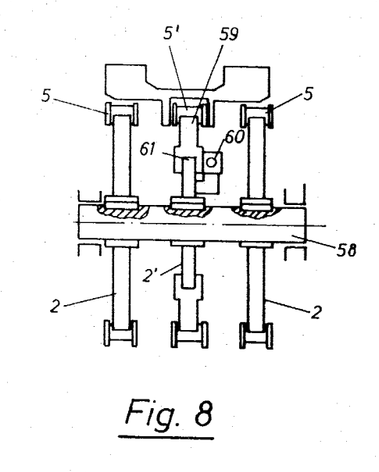
FIG. 8 is a section on line VIII—VIII of FIG. 7.

The holders 25, $25^1$, $25^{11}$ etc., are formed as mechanically actuated closing jaws which are held by the chains 5, $5^1$ and moved in the direction 4. The chains 5, $5^1$ have the same peripheral speed so that the driving wheels 2, $2^1$ belonging thereto are fixed on the same driving shaft 58. The chains 5, $5^1$ run on the opposite side over guide rollers.

The gripping jaw 52 is formed as a guide plate and is taken up by the two outer chains 5. The gripping jaw 53 is connected to an arm 62 of a lever 54 which is pivotably mounted on the middle chain $5^1$. Between the gripping jaw 53 and the lever arm 62 springs 63 are arranged which compensate the gripping. The lower lever arm 64 of the lever 54 taking the gripping jaw 53 is provided on its free end with a cam 55 which is guided along the sensing tracks 56 and 57.

As long as the cams 55 are guided along the track 56 the two gripping jaws 52 and 53 remain open. The work pieces therefore can be inserted which takes place by hand or also automatically. If the chains 5, $5^1$ are rotated further in the given direction 4 then the cam 55 arrives under the track 57 so that the jaws are pressed onto the workpiece by means of the lever 54.

If particularly thin or thick workpieces are machined then the chain $5^1$ can be moved relatively to the outer chain 5. This means that the distance between the two jaws 52 and 53 is adjusted and thus correspondingly smaller or larger workpieces can be taken.

The adjustment of the chains relatively to one another is facilitated in that the middle driving wheel $2^1$ consists of a pulley and a rim 59. The rim 59 may be rotated by means of a worm drive 60, 61 on the pulley so that the pulley remains on the driving shaft 58 and only the rim 59 together with the chain $5^1$ is moved relatively to the other two driving wheels 2 and chain 5.

In particular with workpieces of the kind forming the subject-matter namely pieces of planks a frequently varying thickness is found so that the single subsequent adjustment according to the invention turns out to be very advantageous. Furthermore no securing of the adjustment is necessary as a self-locking worm is used. The construction of the holders above described occupy a small amount of space so that the individual holders can be disposed at a relatively short distance from one another which leads to a rational and economic manner of working.

By the simple measure according to the invention therefore a third chain $5^1$ is arranged between the two chains 5, the distance between the gripping plates of the holders 25, $25^1$, $25^{11}$ etc., can be adjusted as large as desired, that is, a large relative displacement between the gripping plates of this holder can be attained. It is thus possible with a small constructional expenditure of arranging very many gripping devices and holders on the chains whereby by the mechanical actuation and the expense of a pneumatic regulation is dispensed with and furthermore by means of a coarse or fine adjustment a very accurate working is ensured even with different thicknesses of wood. This adjustment is likewise very simple and easy. By the use of suitable scales and also by automatic adjustment or by a motor drive it is possible to effect the reciprocal adjustment. To the invention belong also all other possibilities quite irrespective of whether the gripping plates of the holders are fixed on chains or bands. It is essential for the invention for the band which carries the gripping parts of the holders to be capable of being adjusted relative to the band which guides the supporting plate of the holders.

Figure 9:
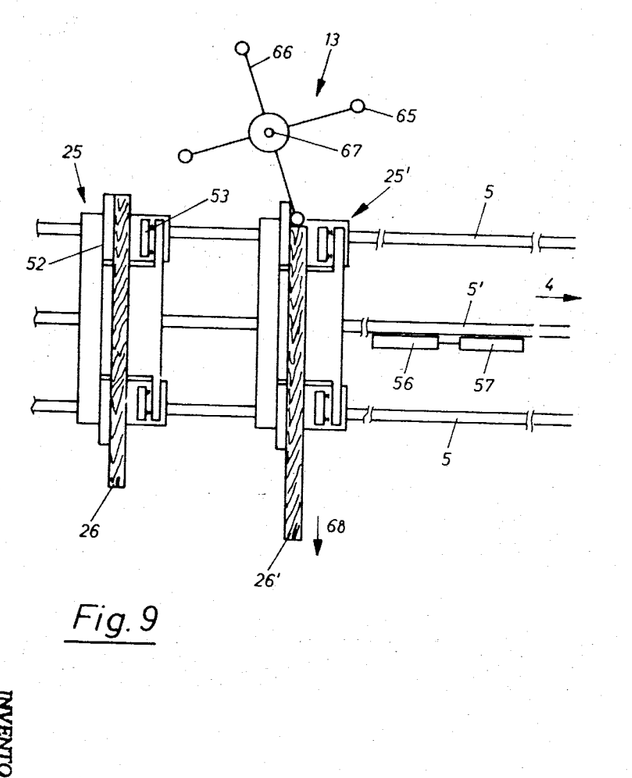
FIG. 9 is a plan of the turnstile.
Figure 10:
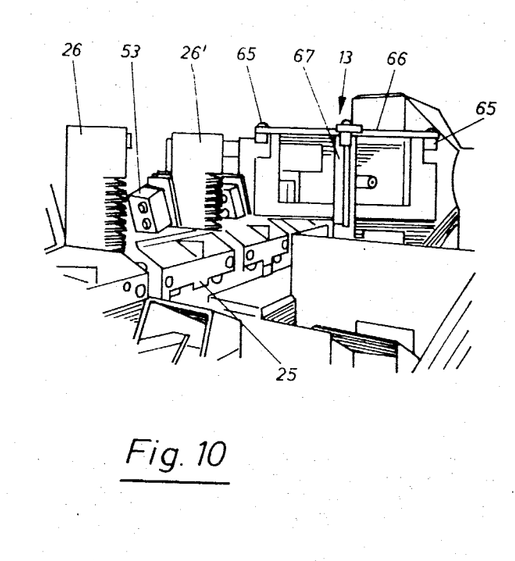
FIG. 10 is an oblique view of the turnstile.

Finally the construction and the manner of operation of the turnstile 13 will be described (FIG. 9 and FIG. 10). The chains 5 and $5^1$ draw the holders 25, $25^1$, $25^{11}$ etc., in the direction of the arrow 4. A greater number of such holders may be provided but for the sake of clarity only two are shown. In the area of the middle chain $5^1$ the switching and control members 56 and 57 (see FIG. 7) are arranged which influence the gripping jaws disposed on the holders by way of an opening and closing movement. Workpieces 26, $26^1$, $26^{11}$ etc., are inserted in the opened gripping jaws.

At the side of the conveying track which is given by the chains 5, $5^1$ and arranged after the first tool spindle stock 11 and turnstile 13 is mounted freely movable around the vertical axis 67, the individual arms 66 of which are suitably longitudinally adjustable. At their ends these arms carry rollers and/or rollers 65 which likewise can freely rotate.

In the area of the turnstile 13 the gripping jaws 52, 53 of the holders 25, $25^1$ etc., are opened. Since according to the invention the turnstile 13 is freely rotatable about its axis 67 and projects with its arms in the area of movement of the holders 25, $25^1$ etc., upon the passing by of a holder one arm of the turnstile is seized and carried along by the holder. Since furthermore the workpiece lies freely between the gripping jaws 52 and 53 of a holder the area of the turnstile it is pushed by the arm taken along in the direction of the arrow 68 so that it arrives in the area of the positioning apparatus 14.

As devices are provided in order to adjust the turnstile as well as also its arms, the device can be used for workpieces of the most varied type. The invention is however not to be limited to the turnstile shown. It is of course quite within the scope of the invention to provide instead of a rotatable member for positioning a slide movable perpendicularly to the direction of movement of four of the holders, which slide is pushed periodically in as the holders pass.

The machine operates as follows:

The individual workpieces 26, $26^1$, etc., of as a rule different lengths are inserted manually or automatically in the holders 25, $25^1$, $25^{11}$, etc., arranged at equal distances from one another carried by the chains 5 and in fact in the front part 50 of the machine supported on the stop 51. On its way to the first spindle stock 11 the holders 25, $25^1$, $25^{11}$, etc., close automatically and thus firmly clamp the workpieces taken up by them. The workpieces now reach due to the stop 51 and their fixing in the holders the position suitable for machining to the spindle stock 11 where one side is pre-cut by the first tool spindle 23 and is then given a finishing cut by the second tool spindle 24. The holders are then released automatically so that the workpieces are movable in the holders perpendicularly to their direction of movement 4. The turnstile 13 which is mounted freely rotatable about its vertical axis engages with its longitudinally adjustable arms as the holders pass and pushes the workpieces to the side. The long workpieces now come into the area of the positioning device 14 (FIG. 1 and FIG. 3) which seize the workpieces in the above described manner and again pushes them in the opened holders to the side until they reach the position suitable for machining by the spindle stock 12. The short workpieces are thereby drawn by uninfluenced to the positioning device 14 and only displaced by the adjustable stop bar 30 (FIG. 3). The short and long workpieces positioned in this manner are now firmly clamped directly before the spindle stock 12 in their holders and thus fed to the tools of this spindle stock which now cut the dovetails on the other side of the workpieces.

Figure 5:
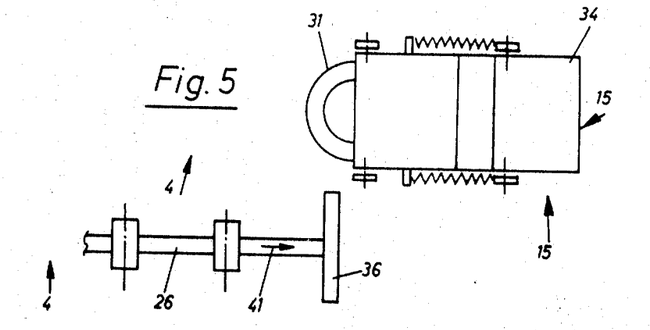
FIG. 5 is a plan of FIG. 4.

If a holder is drawn past on the spindle stock 12 then it is opened and in fact until it has passed the stop bar 36. During the passing by movement of the holder to the stop bar 36 the positioning device 16 is lowered onto the workpiece 26 (FIGS. 4 and 5) and pushes by means of the driven rollers 38 and 39 the workpiece to the stop bar 36. If the workpiece is drawn past on the glue depositing roller 31 then the holder opens and is guided back to its initial position via the driving and guide pulley 2. The workpiece thereby runs onto the run-on receptacle 42 and is thereby pushed out of the jaws of the holder whereby it reaches the supporting face 44 which by reason of the movement forced on it via the lever mechanism 43 is drawn completely from the area of the holders and conveys it to the conveying apparatus 8 which feeds it to the final glueing (FIG. 1 and FIG. 6).

What we claim is:

1. A continuous dovetailing milling machine comprising a plurality of cutting tools, means for moving workpieces to be machined to the tools, said means including holders movable relative to at least one of said tools, and means for temporarily opening and closing the holders for releasing and clamping and holding the workpieces during traveling between the tools and machining of the workpieces by the tool, respectively, at least one automatic positioning device for shifting the workpieces crosswise to their direction of advance toward the tools, said tools including at least one cut-to-length of cross-cut milling cutter and one profile cutter, tool spindles successively positioned relative to the direction of advance of the workpieces and at a distance that is greater than the distance between two successive holders, motor means for driving the tool spindles, the distance between two successive tool spindles and between two successive holders being such that one workpiece becomes engaged by one tool just when the other workpiece leaves the other tool, said positioning device including a belt carrying yieldable strips, at least one portion of said belt being arranged to be moved in a horizontal direction forming an acute angle with the said direction of the advance of the workpieces.

2. The structure as defined in claim 1 wherein the speed of rotation of the belt is such that the normal projection of the speed of rotation relative to the direction of movement of the workpiece is approximately equal to the speed of rotation of the workpieces.

References Cited

UNITED STATES PATENTS

| | | | |
|---|---|---|---|
| 1,052,600 | 2/1913 | Linderman | 144—87 |
| 1,095,233 | 5/1914 | Rose | 144—91 |
| 2,868,249 | 1/1959 | Taylor et al. | 144—91 |
| 3,179,135 | 4/1965 | Windsor | 144—3 |

FOREIGN PATENTS 751,597  6/1956  Great Britain.

DONALD R. SCHRAN, Primary Examiner

U.S. Cl. X.R.

144—3